(12) United States Patent
Kang et al.

(10) Patent No.: US 7,623,562 B2
(45) Date of Patent: Nov. 24, 2009

(54) INITIAL SYNCHRONIZATION ACQUIRING DEVICE AND METHOD FOR PARALLEL PROCESSED DS-CDMA UWB SYSTEM AND DS-CDMA SYSTEM'S RECEIVER USING THE SAME

(75) Inventors: Kyu Min Kang, Taejon (KR); Bub Joo Kang, Taejon (KR); Sangsung Choi, Taejon (KR); Kwang Roh Park, Taejon (KR); Chae Kyu Kim, Taejon (KR); Jeong Goo Lee, Seoul (KR)

(73) Assignee: Electronics and Telecommunications Research Institute, Taejon (KR)

( * ) Notice: Subject to any disclaimer, the term of this patent is extended or adjusted under 35 U.S.C. 154(b) by 701 days.

(21) Appl. No.: 11/065,570

(22) Filed: Feb. 25, 2005

(65) Prior Publication Data

US 2006/0083269 A1 Apr. 20, 2006

(30) Foreign Application Priority Data

Oct. 19, 2004 (KR) .................... 10-2004-0083753

(51) Int. Cl.
*H04B 1/69* (2006.01)
(52) U.S. Cl. ...................................... 375/142; 370/509
(58) Field of Classification Search ................. 375/142; 370/509
See application file for complete search history.

(56) References Cited

U.S. PATENT DOCUMENTS

| 5,237,586 A * | 8/1993 | Bottomley .................. 375/150 |
| 6,356,542 B1 | 3/2002 | Hayata | |
| 6,959,031 B2 * | 10/2005 | Haynes et al. .............. 375/130 |
| 2002/0018514 A1 * | 2/2002 | Haynes et al. .............. 375/130 |

(Continued)

FOREIGN PATENT DOCUMENTS

KR 1020000075292 12/2000

OTHER PUBLICATIONS

Walter R. Braun; *PN Acquisition and Tracking Performance in DS/CDMA Systems with symbol-Length Spreading Sequences*; IEEE Transactions on Communications, vol. 45, No. 12, Dec. 1997; pp. 1595-1601.

*Primary Examiner*—Shuwang Liu
*Assistant Examiner*—Michael R Neff
(74) *Attorney, Agent, or Firm*—Lowe Hauptman Ham & Berner, LLP (57) ABSTRACT

Provided are an initial synchronization acquiring device and method in a parallel processed DS-CDMA UWB system and a DS-CDMA UWB system's receiver using the same. The initial synchronization acquiring device is constructed to include a correlator for correlating input signals and outputting correlation result values and an initial synchronizer for tuning initial symbol synchronization and frame synchronization by using the correlation result values received from the correlator and then storing combining mark values and a synchronization position value in a register, thereby making it possible to greatly decrease a system's complexity, compared to the existing method of separately designing respective modules for acquiring packet synchronization and symbol synchronization in the existing CDMA system. Also, the initial synchronization acquiring device and method additionally compensates a synchronization error caused by a frequency offset generated between clocks used by a transmitter and a receiver and thereby can be efficiently used in the high-speed and parallel-processed DS-CDMA UWB system.

11 Claims, 4 Drawing Sheets

U.S. PATENT DOCUMENTS

2003/0147365 A1* 8/2003 Terasawa et al. ............ 370/335
2003/0198308 A1* 10/2003 Hoctor et al. ............... 375/354
2004/0005914 A1* 1/2004 Dear .......................... 455/563
2004/0179507 A1* 9/2004 Batra et al. ................. 370/343
2005/0152329 A1* 7/2005 Krishnan et al. ............ 370/345

* cited by examiner

INITIAL SYNCHRONIZATION ACQUIRING DEVICE AND METHOD FOR PARALLEL PROCESSED DS-CDMA UWB SYSTEM AND DS-CDMA SYSTEM'S RECEIVER USING THE SAME

BACKGROUND OF THE INVENTION

1. Field of the Invention

The present invention relates to an initial synchronization acquiring device and method in a parallel processed DS-CDMA UWB system and a DS-CDMA UWB system's receiver using the same, and more particularly, to an initial synchronization acquiring device and method in a parallel processed DS-CDMA UWB system and a DS-CDMA UWB system's receiver using the same, which not only can simultaneously acquire an initial symbol synchronization and a frame synchronization but also can compensate a synchronization error caused by a frequency offset.

2. Description of the Related Art

The UWB (Ultra Wide-Band) system, standardization of which is being currently conducted at the IEEE (Institute of Electrical and Electronics Engineering) 802.15.3a (working group for wireless personal area network), is classified into a DS-CDMA (Direct Sequence Code Division Multiple Access) UWB system and a MB-OFDM (Multi-Band Orthogonal Frequency Division Multiplexing) UWB system. Of the two UWB systems, the DS-CDMA UWB system is currently proposed as a standard method.

The DS-CDMA UWB system transmits signals by using ultra wideband frequencies to thus seriously incur multi-path fading caused by multi-paths of a signal transmission channel, a phase offset and a signal synchronization error caused by a frequency offset generated between clocks used by a transmitter and a receiver. There have been known various methods for compensating the synchronization error. However, it is difficult to efficiently apply such existing methods to the DS-CDMA UWB system that uses an ultra-wide frequency band and performs packet data communication. The existing CDMA system designs and uses respective modules for compensating a frequency offset and tuning packet synchronization and symbol synchronization to thus have a problem in that its complexity is great.

In a data frame structure of the DS-CDMA UWB system modem, about 15 µs are assigned to a normal preamble period. In the normal preamble period, a period assigned for initial synchronization is within the range of 5 µs through 10 µs after the first preamble sequence is transmitted. Accordingly, in designing a DS-CDMA UWB receiver, it is necessary to design a searcher for acquiring initial synchronization during the preamble pattern transmission period corresponding to the 5 µs period so as to acquire initial symbol synchronization and frame synchronization. For initial synchronization, the existing IS-95 (Industry Standard-95) or WCDMA (Wideband CDMA) system transmits a pilot signal at a base station and acquires initial code synchronization from the pilot signal.

However, the UWB system needs to transmit a preamble signal instead of a pilot signal and acquire initial symbol synchronization and frame synchronization from the preamble sequence when performing communication in one piconet. Additionally, the UWB system should compensate a synchronization error caused by a frequency offset generated between clocks respectively used by a transmitter and a receiver. Accordingly, the UWB system should acquire initial synchronization within a relatively short preamble transmission period and process high-speed data to thus need a correlator and a searcher that are designed in a parallel structure.

SUMMARY OF THE INVENTION

Accordingly, the present invention is contrived to solve the problems of the prior art and is therefore directed to an initial synchronization acquiring device and method in a parallel processed DS-CDMA UWB system and a DS-CDMA UWB system's receiver using the same, which not only can simultaneously acquire an initial symbol synchronization and a frame synchronization but also can compensate a synchronization error caused by a frequency offset.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an initial synchronization acquiring device in a parallel processed DS-CDMA UWB system. The device includes: a correlator for correlating input signals and outputting correlation result values; and an initial synchronizer for tuning initial symbol synchronization and frame synchronization by using the correlation result values received from the correlator and then storing combining mark values and a synchronization position value in a register.

In another aspect of the present invention, there is provided an initial synchronization acquiring method in a parallel processed DS-CDMA UWB system. The method includes the steps of: (a) correlating input signals and outputting correlation result values; (b) performing a symbol coherent combining with respect to a reception signal of the correlation result values and then outputting a combining result value; (c) calculating an energy value by using the combining result value and performing a noncoherent combining with respect to the calculated energy value and thereby outputting a discrimination result value; and (d) storing the discrimination result value in a buffer and then, if combining mark values within the buffer are changed, obtaining a synchronization position value and storing the obtained synchronization position value and combining mark values in a register.

In further another aspect of the present invention, there is provided a receiver using an initial synchronization acquiring device in a parallel processed DS-CDMA UWB system. The receiver includes: an ADC (analog-to-digital converter) for receiving an analog signal into which a signal received from a transmitter is baseband-converted by an RF (Radio Frequency) processing block of a receiver, and then converting the analog signal into a digital signal; a correlator for correlating the digital signals received from the ADC and outputting correlation result values; and an initial synchronizer for tuning initial symbol synchronization and frame synchronization by using the correlation result values received from the correlator and then storing combining mark values and a synchronization position value in a register.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
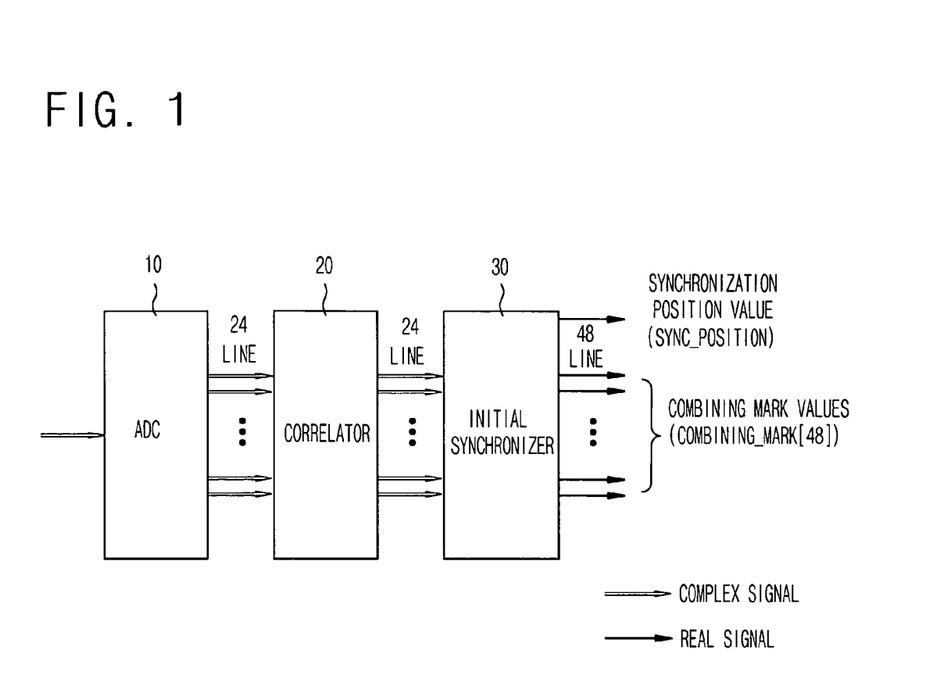
FIG. 1 is a block diagram illustrating a searcher of a DS-CDMA UWB modem receiver according to an embodiment of the present invention.

FIG. 1 is a block diagram illustrating a searcher of a DS-CDMA UWB modem receiver according to an embodiment of the present invention.

Referring to FIG. 1, the searcher is constructed to include an analog-to-digital converter (ADC) 10 for receiving an analog signal into which a signal received from a transmitter is baseband-converted by an RF (Radio Frequency) processing block of a receiver and then converting the analog signal into a digital signal, a correlator 20 for correlating 24 signals received from the ADC 10 and then outputting 24 result values to an initial synchronizer 30 so as to parallel process the 24 received signals, and the initial synchronizer 30 for tuning initial symbol synchronization and frame synchronization and then storing 48 (the number of chips corresponding to an interval between two symbol) combining mark values (COMBINING_MARK[48]) and a synchronization position value (SYNC_POSITION) in a register.

The so-constructed searcher operates so as to acquire initial symbol synchronization and frame synchronization during the preamble transmission period, and additionally compensates a synchronization error caused by a frequency offset generated between clocks respectively used by a transmitter and a receiver.

Figure 2:
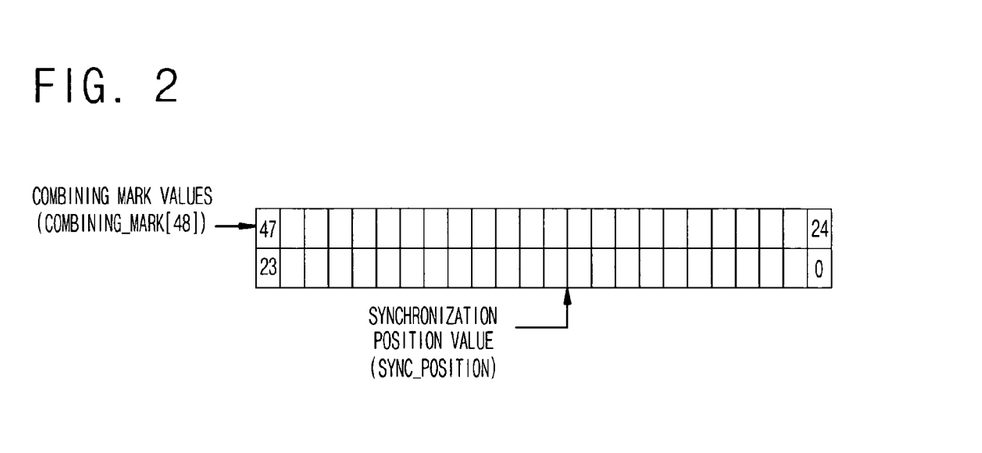
FIG. 2 is a diagram illustrating a structure of a register for storing the combining mark values shown in FIG. 1.

FIG. 2 is a diagram illustrating a structure of a register for storing the 48 combining mark values shown in FIG. 1.

Referring to FIG. 2, a reception data process such as a reception data demodulation and a reception signal energy comparison is performed with reference to 24 successive combining mark values after the synchronization position value (SYNC_POSITION), out of the 48 combining mark values (COMBINING_MARK[48]). For example, if a referred combining mark value is '1', a result value of a corresponding rake receiver finger is utilized in performing the received data process, otherwise if a referred combining mark value is '0', a result value of a corresponding rake receiver finger is not utilized in performing the received data process. Values stored in the register are used in estimating a channel change through a tracking process performed during the actual transmission of a data symbol, and varied synchronization position value and combining mark values are continuously updated and the updated values are then utilized in demodulating data.

Figure 3:
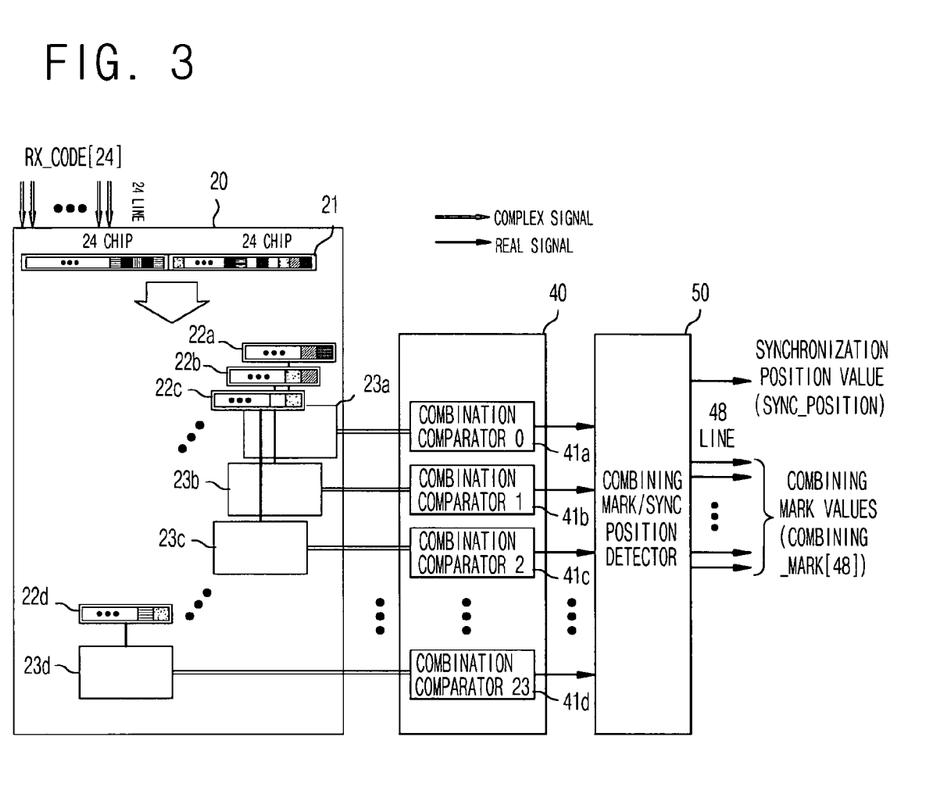
FIG. 3 is a detailed block diagram illustrating a searcher for acquiring an initial synchronization of a DS-CDMA UWB modem according to an embodiment of the present invention.

FIG. 3 is a detailed block diagram illustrating a searcher for acquiring an initial synchronization of a DS-CDMA UWB modem according to an embodiment of the present invention.

Referring to FIG. 3, the searcher is constructed to include a correlator 20, a synchronization discriminator 40 and a combining mark/synchronization position detector 50. All the modules in the searcher are operated with a symbol clock.

The correlator 20 is constructed to include a 48-chip-sized buffer 21 for storing 24 complex values received from the ADC 10, and correlation operators 23A, 23B, 23C ... 23D for respectively correlating distribution values 22A, 22B, 22C ... 22D of the complex values received from the buffer 21 with a 24-length ternary code and then outputting the resulting correlation values to the synchronization discriminator 40. Here, the correlator 20 is designed in shared logics so as to be used not only for an initial synchronization but also for a subsequent channel estimation and energy calculation.

The synchronization discriminator 40 is constructed to include a plurality of combination comparators 41A, 41B, 41C ... 41D to thereby determine whether signals received from the correlator 20 are synchronized and then output 24 resulting values.

The combining mark/synchronization position detector 50 is a module for detecting combining mark values (COMBINING_MARK[48]) and a synchronization position value (SYNC_POSITION). The combining mark/synchronization position detector 50 stores the 24 resulting values received from the synchronization discriminator 40 in a 48-chip-sized buffer and then, if combining mark values within the buffer are changed, obtains a synchronization position value to then store the obtained synchronization position value and combining mark values in a register so as to use the stored synchronization position value and combining mark values for data demodulation.

Figure 4:
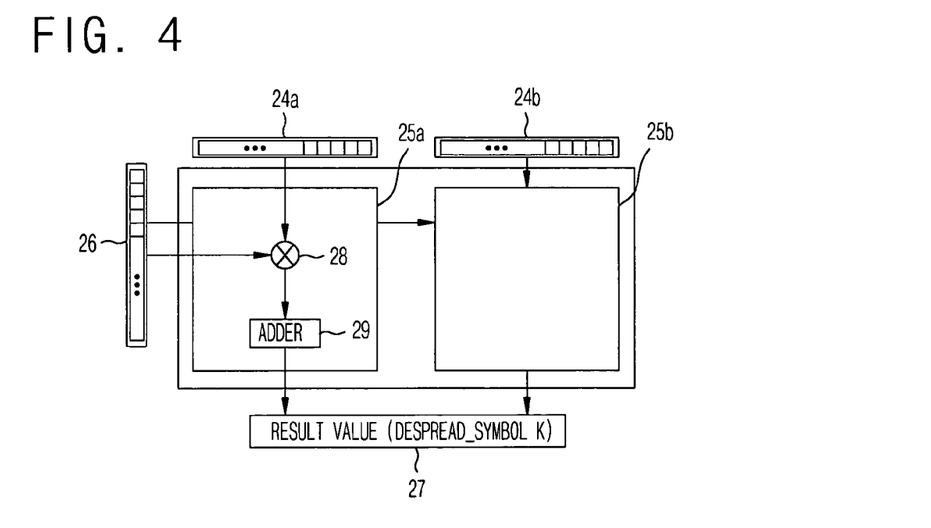
FIG. 4 is a detailed block diagram illustrating a correlation operator of a correlator shown in FIG. 3.

FIG. 4 is a detailed block diagram illustrating a $K^{th}$ correlation operator of the correlator shown in FIG. 3.

Referring to FIG. 4, 24 complex values received from the ADC 10 are respectively stored in the 48-chip-sized buffer of the correlator 20. In the $K^{th}$ correlation operator, distribution values of a complex value received from the 48-chip-sized buffer are distributed into a 24-chip real part input value 24A and a 24-chip imaginary part input value 24B. The real part input value 24A is inputted to a real part correlation operator 25A, and the imaginary part input value 24B is inputted to an imaginary part correlation operator 25B.

Here, the real part correlation operator 25A and the imaginary part correlation operator 25B have the same structure, and respectively correlate the respective input values with a 24-length ternary code to thereby obtain respective result values 27 (DESPREAD_SYMBOL K).

That is, the real part correlation operator 25A is constructed to include a multiplier 28 for multiplying the 24-chip real part input value 24A by a 24-length ternary code 26 and an adder 29 for adding values from the multiplier 28, to thereby output a $K^{th}$ real part resulting value 27 (DESPREAD_SYMBOL K) Similarly, the imaginary part correlation operator 25B performs the same correlation operation as the real part correlation operator 25A, to thereby output a $K^{th}$ imaginary part resulting value (DESPREAD_SYMBOL K). In this manner, a $K^{th}$ resulting value corresponding to the complex value received from the 48-chip-sized buffer of the correlator 20 is obtained by the real and imaginary part correlation operators 25A and 25B.

Figure 5:
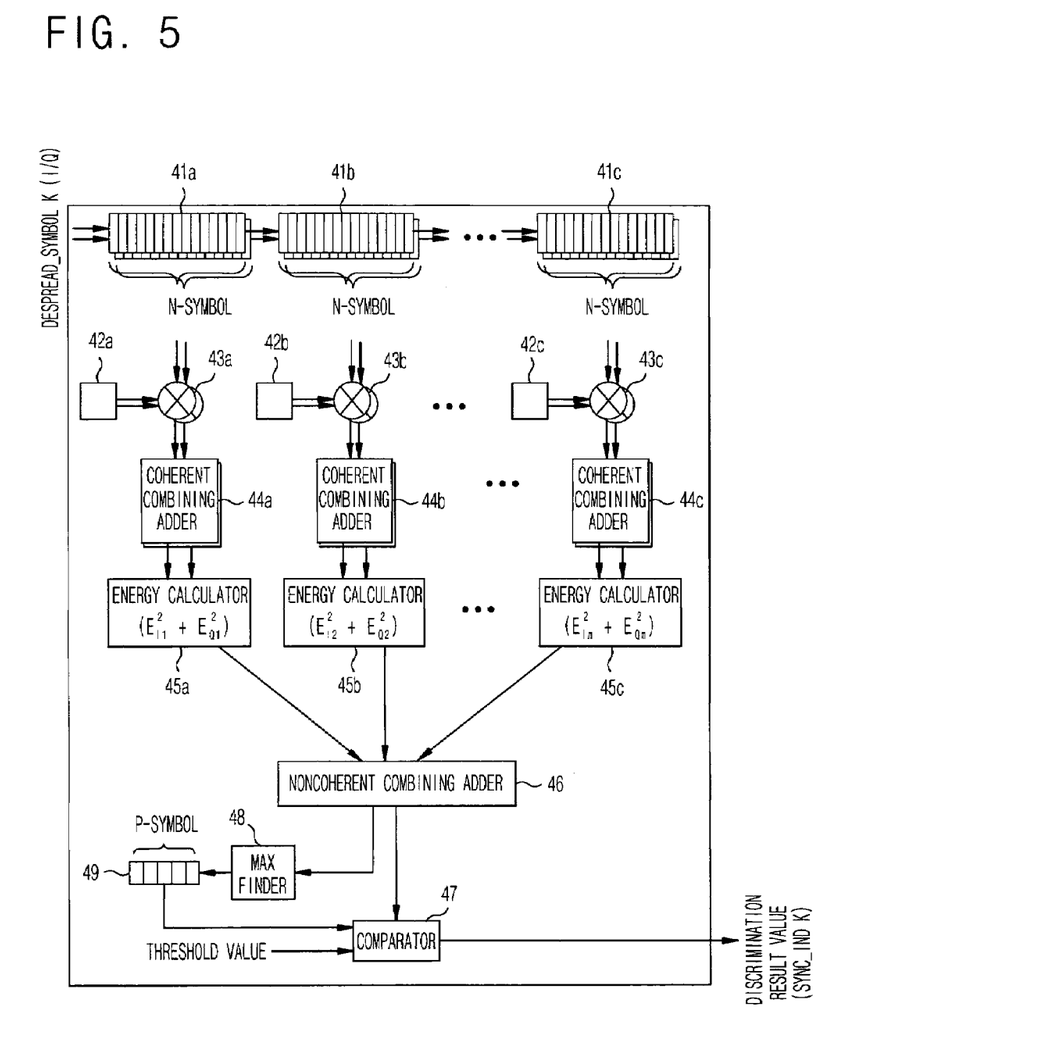
FIG. 5 is a detailed block diagram illustrating 24 initial synchronization acquisition/non-acquisition discriminators used in a searcher shown in FIG. 3.

FIG. 5 is a detailed block diagram illustrating a $K^{th}$ initial synchronization acquisition/non-acquisition discriminator out of 24 initial synchronization acquisition/non-acquisition discriminators used in the searcher shown in FIG. 3. The initial synchronization acquisition/non-acquisition discriminator is operated to perform N-symbol coherent combining and M-symbol noncoherent combining.

Referring to FIG. 5, the initial synchronization acquisition/non-acquisition discriminator is constructed to include multipliers 43A, 43B . . . 43C for respectively receiving N×M tap N-symbol input signals 41A, 41B . . . 41C upon reception of despread complex values (DESPREAD_SYMBOL K) from the correlator 20 and then respectively multiplying the input signals 41A, 41B . . . 41C by preamble patterns received from symbol matched filters 42A, 42B . . . 42C; coherent combining adders 44A, 44B . . . 44C for coherently combining the resulting multiplication values received from the multipliers 43A, 43B . . . 43C to thereby output M pairs of coherent combining values; energy calculators 45A, 45B . . . 45C for calculating M energy values by adding an inphase value and a quadrature value of each M pairs of coherent combining values received from the coherent combining adders 44A, 44B . . . 44C; a noncoherent combining adder 46 for noncoherently combining the M energy values received from the energy calculators 45A, 45B . . . 45C to thereby outputting a resulting noncoherent combining value; a comparator 47 for comparing the noncoherent combining value received from the noncoherent combining adder 46 with a threshold value, and then continuously performing a filtering function with a predetermined preamble pattern if the noncoherent combining value is identical to or below the threshold value, or resetting a N×M symbol out of a N×M+A symbol period as a preamble pattern and then performing a filtering function with the reset preamble pattern if the noncoherent combining value is above the threshold value; a max finder 48 for comparing calculated energy values received through the noncoherent combining adder 46 and then storing up to P (P≧1) grade resulting discrimination values and thereby determining whether synchronization is performed; and a max storage 49 for storing the up to P-grade resulting discrimination values received from the max finder 48.

In particular, values corresponding to a N×M symbol period are used for preamble patterns of the symbol matched filters 42A, 42B . . . 42C, and values corresponding to the N×M+A symbol period are used for next preamble patterns of the symbol matched filters 42A, 42B . . . 42C in consideration of the operation speed of an algorithm. Here, 'A' is a positive integer.

Also, the symbol matched filters 42A, 42B . . . 42C output corresponding results at each and every symbol input, and is operated until the combining mark values and the synchronization position value are obtained. Accordingly, the initial synchronization acquisition/non-acquisition discriminator is operated with a symbol clock.

In this manner, the initial synchronization acquisition/non-acquisition discriminator can use various-length coherent/noncoherent combining methods according to a channel environment and a reception structure.

Figure 6:
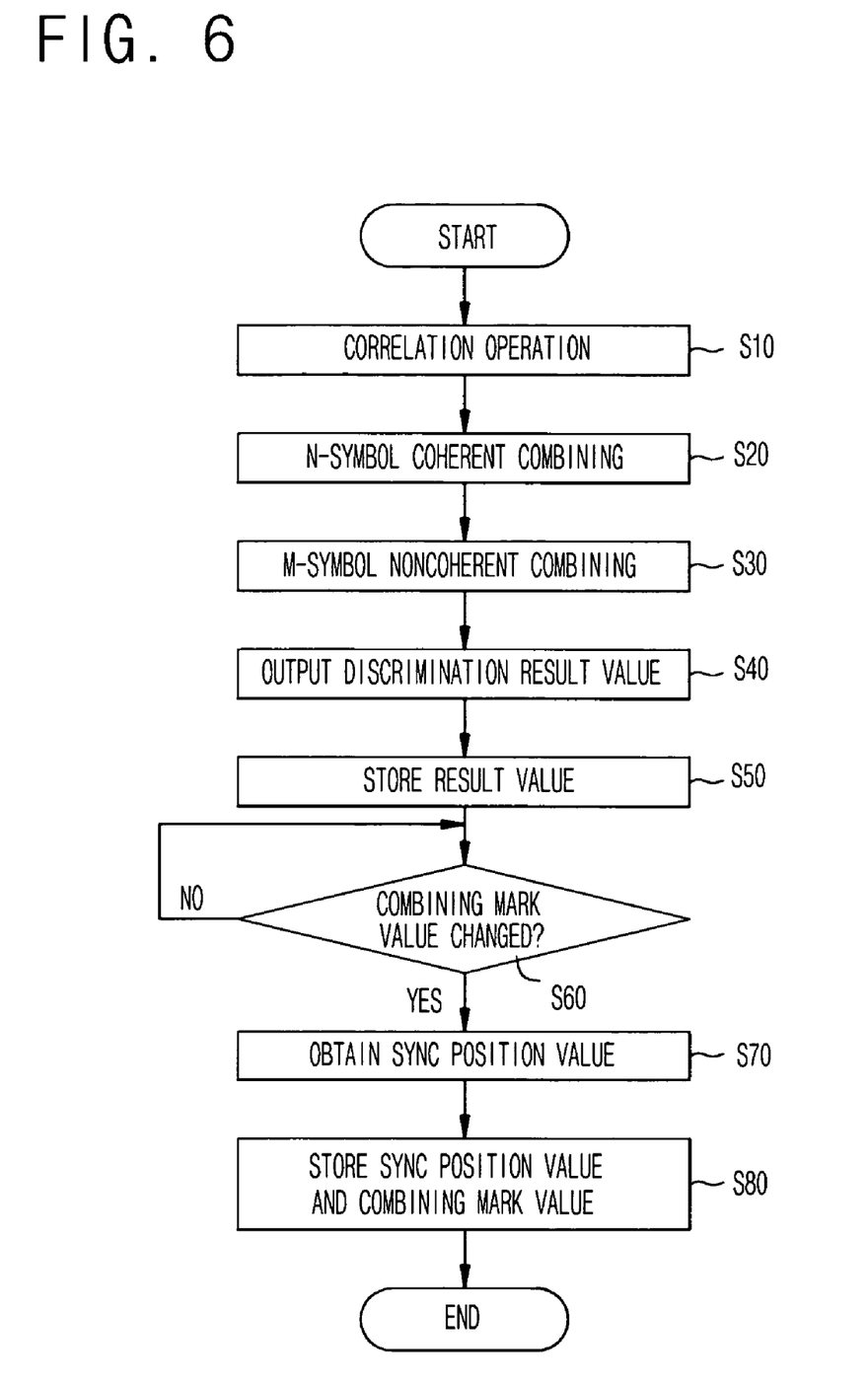
FIG. 6 is a block diagram illustrating an initial synchronization acquiring method in a parallel processed DS-CDMA UWB system according to an embodiment of the present invention.

FIG. 6 is a block diagram illustrating a procedure of an initial synchronization acquiring method in a parallel processed DS-CDMA UWB system according to an embodiment of the present invention. An initial symbol synchronization/frame synchronization acquiring method will now be described wit reference to FIG. 6.

Referring to FIG. 6, in order to parallel process the searcher including 24 correlators 20, the correlator 20 receives 24 signals from the ADC 10 and correlates the 24 signals to thereby output 24 result signals to the synchronization acquisition/non-acquisition discriminators (S10).

In order to determine whether the signals received from the correlator 20 are synchronized, the synchronization acquisition/non-acquisition discriminators each perform N-symbol coherent combining on inphase and quadrature signals of the 24 result values received from the correlator 20 (S20) and perform M-symbol noncoherent combining on the resulting signals (S30) to thereby output 24 discrimination result values (SYNC_IND K) to the combining mark/synchronization position detector 50 (S40). At this time, if a noncoherent combining results value exceeds a threshold value at specific times or more, or if a result value calculated in a set interval (N×M+A symbol interval) continuously exceeds the threshold value, or if a result value calculated by the discriminator after the N×M+A symbol interval from the occurrence of a result value above the threshold value is above X% of a maximum value calculated by the max finder 48, the discrimination result value is outputted as '1'. Otherwise, the discrimination result value is outputted as '0'.

Here, in the N-symbol coherent combining step S20, when a complex result value (DESPREAD_SYMBOL K) despread by the correlator 20 is inputted to the synchronization acquisition/non-acquisition discriminator, the discriminator receives N×M tap N-symbol input signals (41A, 41B . . . 41C) and respectively multiplies the continuous N-symbol input signals 41A, 41B . . . 41C by preamble patterns received from the symbol matched filers 42A, 42B . . . 42C and coherently combining the resulting multiplication values and then outputs M pairs of combining result values.

In the M-symbol noncoherent combining step S30, the discriminator adds inphase and quadrature values of the M pairs of combining results values to thereby calculate M energy values, and then noncoherently combines the M energy values to thereby output a noncoherent combining result value.

If the noncoherent combining result value is identical to or below a threshold value, the discriminator continuously performs a filtering function with a predetermined preamble pattern. Otherwise, if the noncoherent combining result value is above the threshold value, the discriminator resets a N×M symbol out of a N×M+A symbol period as a preamble pattern and performs a filtering function with the reset preamble pattern to thereby generate a discrimination result value.

The combining mark/synchronization position detector 50 receives 24 discrimination result values from the synchronization discriminator 40 to then store the 24 discrimination result values in a 48-chip-sized buffer (S50), and then checks whether combining mark values in the buffer are changed (S60). If the combining mark values are changed, the detector 50 obtains a synchronization position value (S70) and stores the obtained synchronization position value and combining mark values in a register (S80) so as to use the stored synchronization position value and combining mark values for data demodulation.

The initial synchronization acquiring method according to the present invention can be embodied as a computer-readable recording medium, such as a hard disk, a floppy disk, an optical magnetic disk, a CD-ROM, a ROM and a RAM.

As described above, the initial synchronization acquiring method according to the present invention designs a searcher for acquiring initial synchronization during the preamble pattern transmission period and then simultaneously acquires initial symbol synchronization and frame synchronization by using the searcher, thereby making it possible to greatly decrease a system's complexity, compared to the existing method of separately designing respective modules for acquiring packet synchronization and symbol synchronization in the existing CDMA system.

Also, the initial synchronization acquiring device and method additionally compensates a synchronization error caused by a frequency offset generated between clocks used by a transmitter and a receiver and thereby can be efficiently used in the high-speed and parallel-processed DS-CDMA UWB system.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An initial synchronization acquiring device in a parallel processed DS-CDMA UWB system, the device comprising:
    a correlator for correlating input signals and outputting correlation result values;
    an initial synchronizer for tuning initial symbol synchronization and frame synchronization by using the correlation result values received from the correlator and then generating and storing combining mark values and a synchronization position value in a register wherein the initial synchronizer comprises:
        a synchronization discriminator for determining whether signals received from the correlator are synchronized and then outputting result values; and
        a combining mark/synchronization position detector for storing the result values received from the synchronization discriminator in a buffer and then, if the combining mark values stored within the buffer are changed based on the stored result values, obtaining a synchronization position value and storing the obtained synchronization position value and the changed combining mark values in the register, said combining mark values and the synchronization position value are values resulting after an initial synchronization acquisition;
    wherein the synchronization discriminator comprises:
        a multiplier for receiving a plurality of input signals upon reception of despread complex values from the correlator and then respectively multiplying the input signals by preamble patterns received from a symbol matched filter;
        a coherent combining adder for coherently combining multiplication values received from the multiplier and thereby outputting M pairs of coherent combining result values, wherein M is a positive integer;
        an energy calculator for calculating M energy values by using the coherent combining result values received from the coherent combining adder;
        a noncoherent combining adder for noncoherently combining the M energy values received from the energy calculator and thereby outputting a noncoherent combining result value;
        a comparator for comparing the noncoherent combining result value received from the noncoherent combining adder with a threshold value, and then, if the noncoherent combining result value is identical to or below the threshold value, continuously performing a filtering function with a predetermined preamble pattern, and, if the noncoherent combining result value is above the threshold value, resetting a N×M symbol out of a N×M+A symbol period as a preamble pattern and performing a filtering function with the reset preamble pattern, wherein N is a positive integer and A is a positive integer;
        a max finder for measuring the energy values received through the noncoherent combining adder and then storing up to $P(P \geqq 1)$ grade discrimination result values and thereby determining whether synchronization is performed; and
    a max storage for storing the up to P-grade discrimination result values received from the max finder.

2. The device of claim 1, wherein the correlator comprises:
    a buffer for storing an inputted complex value; and
    a correlation operator for correlating distribution values of the complex value from the buffer with a ternary code and thereby outputting a correlation result value.

3. The device of claim 2, wherein the correlation operator comprises:
    a real part correlation operator for receiving a real part input value from the distribution values of the complex value; and
    an imaginary part correlation operator for receiving an imaginary part input value from the distribution values of the complex value.

4. The device of claim 3, wherein the real part correlation operator comprises:
    a multiplier for multiplying the real part input value by the ternary code; and
    an adder for adding values outputted from the multiplier and thereby outputting a real part correlation result value.

5. The device of claim 3, wherein the imaginary part correlation operator comprises:
    a multiplier for multiplying the imaginary part input value by the ternary code; and
    an adder for adding values outputted from the multiplier and thereby outputting an imaginary part correlation result value.

6. An initial synchronization acquiring method in a parallel processed DS-CDMA UWB system, the method comprising the steps of:
    (a) correlating input signals and outputting correlation result values;
    (b) performing a symbol synchronization coherent combining with respect to a reception signal of the correlation result values and then outputting a combining mark result value;
    (c) calculating an energy value by using the combining mark result value and performing a noncoherent combining with respect to the calculated energy value and thereby outputting a discrimination result value; and
    (d) storing the discrimination result value in a buffer and then, if the combining mark result values within the buffer are changed, obtaining a synchronization position value and storing the obtained synchronization position value and combining mark result values in a register for data demodulation, wherein
    the step (b) respectively multiplies successive symbol input signals by preamble patterns received from a matched filter and coherently combines the multiplication result values; and
    said combining mark result values and the synchronization position value are values resulting after an initial synchronization acquisition;

wherein multiplying successive symbol input signals further comprises receiving a plurality of input signals upon reception of despread complex values from the correlator and then respectively multiplying the input signals by preamble patterns received from a symbol matched filter;

wherein the coherent combining of step (b) includes combining multiplication values received from a multiplier and outputting M pairs of coherent combining result values, wherein M is a positive integer;

wherein the calculating of an energy value of step (c) includes calculating M energy values using the coherent combining result values and noncoherently combining the M energy values, and outputting a noncoherent combining result value; and wherein step (d) includes comparing the noncoherent combining result value with a threshold value, and then, if the noncoherent combining result value is identical to or below the threshold value, continuously performing a filtering function with a predetermined preamble pattern, and, if the noncoherent combining result value is above the threshold value, resetting a N×M symbol out of a N×M+A symbol period as a preamble pattern and performing a filtering function with the reset preamble pattern, wherein N is a positive integer and A is a positive integer.

7. A receiver using an initial synchronization acquiring device in a parallel processed DS-CDMA UWB system, the receiver comprising:

an ADC (analog-to-digital converter) for receiving an analog signal into which a signal received from a transmitter is baseband-converted by an RF (Radio Frequency) processing block of a receiver, and then converting the analog signal into a digital signal;

a correlator for correlating the digital signals received from the ADC and outputting correlation result values;

an initial synchronizer for tuning initial symbol synchronization and frame synchronization by using the correlation result values received from the correlator, generating and then storing combining mark values and a synchronization position value in a register, wherein the initial synchronizer comprises:
 a synchronization discriminator for determining whether signals received from the correlator are synchronized and then outputting result values;
 a combining mark/synchronization position detector for storing the result values received from the synchronization discriminator in a buffer and then, if the generated combining mark values within the buffer are changed, obtaining a synchronization position value and storing the obtained synchronization position value and the changed combining mark values in the register; and said combining mark values and the synchronization position value are values resulting after an initial synchronization acquisition;

wherein the synchronization discriminator comprises:
 a multiplier for receiving a plurality of input signals upon reception of despread complex values from the correlator and then respectively multiplying the input signals by preamble patterns received from a symbol matched filter;
 a coherent combining adder for coherently combining multiplication values received from the multiplier and thereby outputting M pairs of coherent combining result values, wherein M is a positive integer;
 an energy calculator for calculating M energy values by using the coherent combining result values received from the coherent combining adder;
 a noncoherent combining adder for noncoherently combining the M energy values received from the energy calculator and thereby outputting a noncoherent combining result value;
 a comparator for comparing the noncoherent combining result value received from the noncoherent combining adder with a threshold value, and then, if the noncoherent combining result value is identical to or below the threshold value, continuously performing a filtering function with a predetermined preamble pattern, and, if the noncoherent combining result value is above the threshold value, resetting a N×M symbol out of a N×M+A symbol period as a preamble pattern and performing a filtering function with the reset preamble pattern, wherein N is a positive integer and A is a positive integer;
 a max finder for measuring the energy values received through the noncoherent combining adder and then storing up to P(P≧1) grade discrimination result values and thereby determining whether synchronization is performed; and a max storage for storing the up to P-grade discrimination result values received from the max finder.

8. The receiver of claim 7, wherein the correlator comprises:
 a buffer for storing an inputted complex value; and
 a correlation operator for correlating distribution values of the complex value from the buffer with a ternary code and thereby outputting a correlation result value.

9. The receiver of claim 8, wherein the correlation operator comprises:
 a real part correlation operator for receiving a real part input value from the distribution values of the complex value; and
 an imaginary part correlation operator for receiving an imaginary part input value from the distribution values of the complex value.

10. The receiver of claim 9, wherein the real part correlation operator comprises:
 a multiplier for multiplying the real part input value by the ternary code; and
 an adder for adding values outputted from the multiplier and thereby outputting a real part correlation result value.

11. The receiver of claim 9, wherein the imaginary part correlation operator comprises:
 a multiplier for multiplying the imaginary part input value by the ternary code; and
 an adder for adding values outputted from the multiplier and thereby outputting an imaginary part correlation result value.

* * * * *